United States Patent [19]

Robbins et al.

[11] 4,068,155

[45] Jan. 10, 1978

[54] CONTROL SYSTEM FOR OPERATING MACHINE

[76] Inventors: Roscoe S. Robbins, Rte. 1, Box 764, Burleson, Tex. 76028; Donald R. Zuccaro, 4029 Walnut St., Garland, Tex. 75042

[21] Appl. No.: 763,885

[22] Filed: Jan. 31, 1977

[51] Int. Cl.$^2$ ............................................. G05B 19/04
[52] U.S. Cl. ..................................... 318/568; 364/104
[58] Field of Search ................. 340/172.5; 235/151.1; 318/568

[56] References Cited

U.S. PATENT DOCUMENTS 2,852,727  9/1958  Barnett ................................. 318/568
3,689,892  9/1972  Glenn et al. ...................... 318/568 X Primary Examiner—Eugene G. Botz
Attorney, Agent, or Firm—Wofford, Felsman, Fails & Zobal

[57] ABSTRACT

A control system for operating a vacuum forming machine in a program mode and in an automatic mode. A plurality of switches movable to control and clear positions are employed to set up a sequence of steps for operating the machine in the program mode. The sequence of switch positions is stored in a memory system during the program mode and read out during the automatic mode to allow the machine to carry out and duplicate the sequence of steps in the same time relationship as occured during the program mode.

3 Claims, 6 Drawing Figures

CONTROL SYSTEM FOR OPERATING MACHINE

BACKGROUND OF THE INVENTION

Custom vacuum forming machines are available on the market for molding articles from sheets of plastic. Such machines generally are employed for forming articles on a limited production basis. The known prior machines are controlled manually by a plurality of toggle switches or automatically by a fixed automatic system. The disadvantages of the manually controlled machine is that it is difficult to duplicate a desired sequence of steps with such a machine. The known automatic machines have disadvantages in that their operating steps are fixed or cannot be changed easily whereby such machines are not very versatile.

SUMMARY OF THE INVENTION

It is an object of the present invention to provide a control system for an operating machine which is capable of operating the machine manually in a program mode and automatically in an automatic mode. In the program mode, the machine is operated manually to set up a desired sequence of steps in an optimum time relationship. This information is stored in a memory during the program mode and read out during the automatic mode to perform the same sequence of steps in the same time relationship as occurred during the program mode.

In a further aspect, the control system comprises a plurality of switch means movable to control and clear positions to operate the machine to perform the desired sequence of steps. The switch positions are stored in memory as the steps are carried out. For subsequent cycles the switch means are moved to an automatic mode position and the stored switch positions read out of memory to control the machine to carry out the duplicate the same sequence of steps in the same time relationship as occured during the program mode.

Thus, the control system allows a desired sequence of steps to be set up by the operator in an optimum time relationship, stored in memory, and then read out to allow the machine to automatically perform the same sequence of steps in the same time relationship previously set by the operator in the program mode. Such a system avoids the disadvantages of the prior machines and yet provides a machine that is very versatile in its operations and can be operated automatically.

BRIEF DESCRIPTION OF THE DRAWINGS

FIGS. 3A-3D can be read by placing these four figures together with FIG. A in the upper left quadrant, FIG. 3B in the upper right quadrant, FIG. 3C in the lower left quadrant, and FIG. 3D in the lower right quadrant.

DESCRIPTION OF VACUUM MOLDING MACHINE

Figure 1:
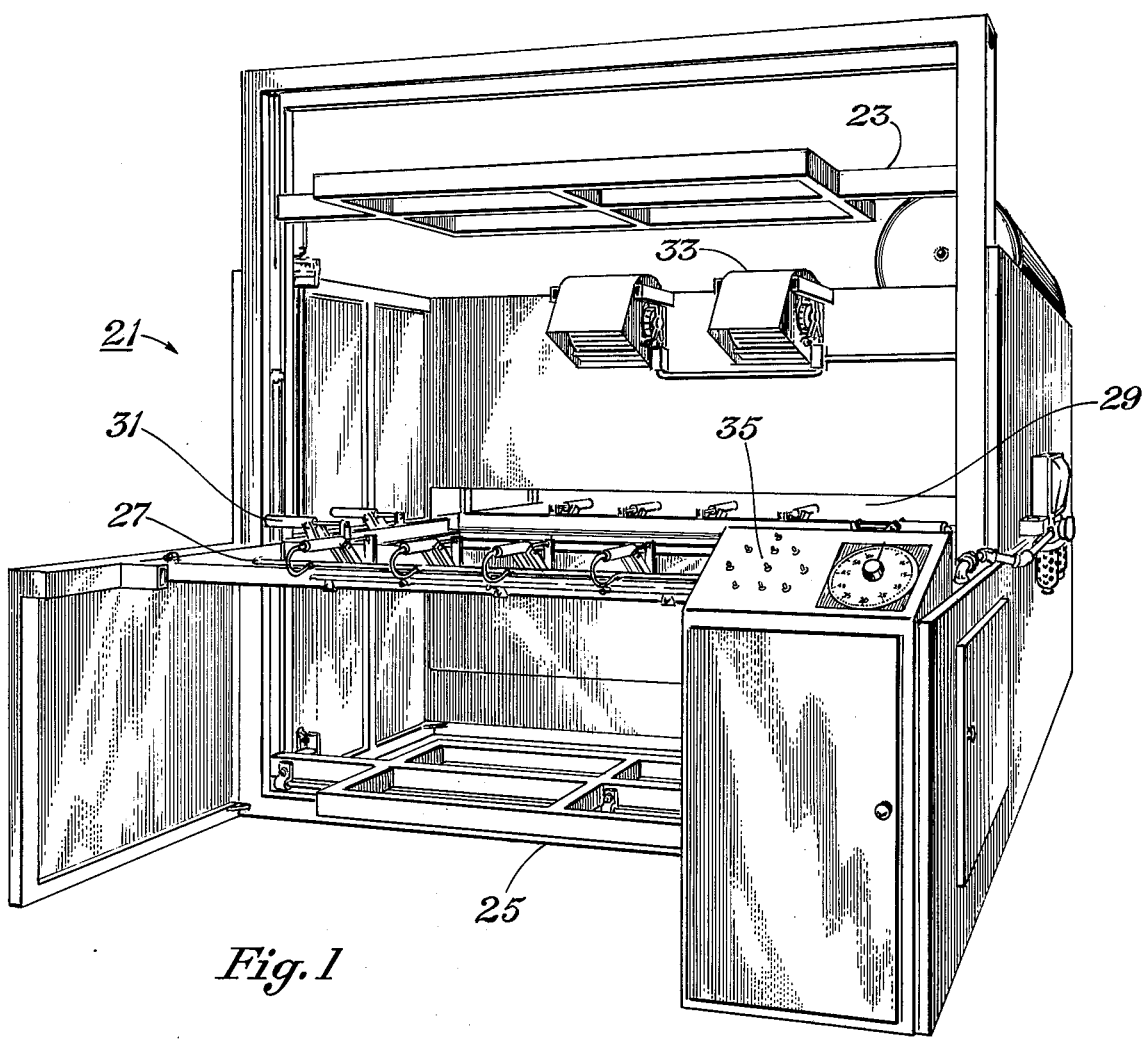
FIG. 1 is a perspective view of a custom vacuum forming machine for molding articles from sheets of plastic material.

Referring now to FIG. 1, there is illustrated a custom vacuum molding machine 21 with which the control system of the present invention may be employed. It is to be understood that the control system may be used for controlling other types of machines which perform a sequence of operating steps. The vacuum forming machine shown in FIG. 1 is a manually controllable machine commercially available on the market. Basically, it comprises an upper platen 23 which may be lowered and raised; a lower platen 25 which may be raised and lowered, a car or frame 27 which is moved into and out of an oven 29; clamps 31 employed for clamping a sheet of plastic (thermoplastic) material to the car; an air pressure and vacuum system (not shown in FIG. 1) associated with each upper and lower platen; cooling fans 33; and a system for spraying a water mist (not shown) onto the molded product. In the manually controlled machine, the above components are controlled by operating a plurality of toggle switches 35. Each toggle switch controls a solenoid which in turn controls its associated component. In use, a sheet of plastic material is clamped to the car 27 with the clamps 31. The car with the plastic sheet is moved into the oven 29 to heat the plastic to a soft condition and then moved out of the oven. A mold, for example, may be supported on the lower platen 25 and the lower platen moved upward against the bottom of the soft plastic sheet. A vacuum is employed to draw the sheet of plastic inside of the female mold. After the sheet has been formed to the shape of the mold, air may be blown onto the formed product in the mold for cooling purposes. After cooling, compressed air then is employed to remove the formed product from the mold. The upper platen may be used in a similar manner.

DETAILED DESCRIPTION OF THE INVENTION

Figure 2:
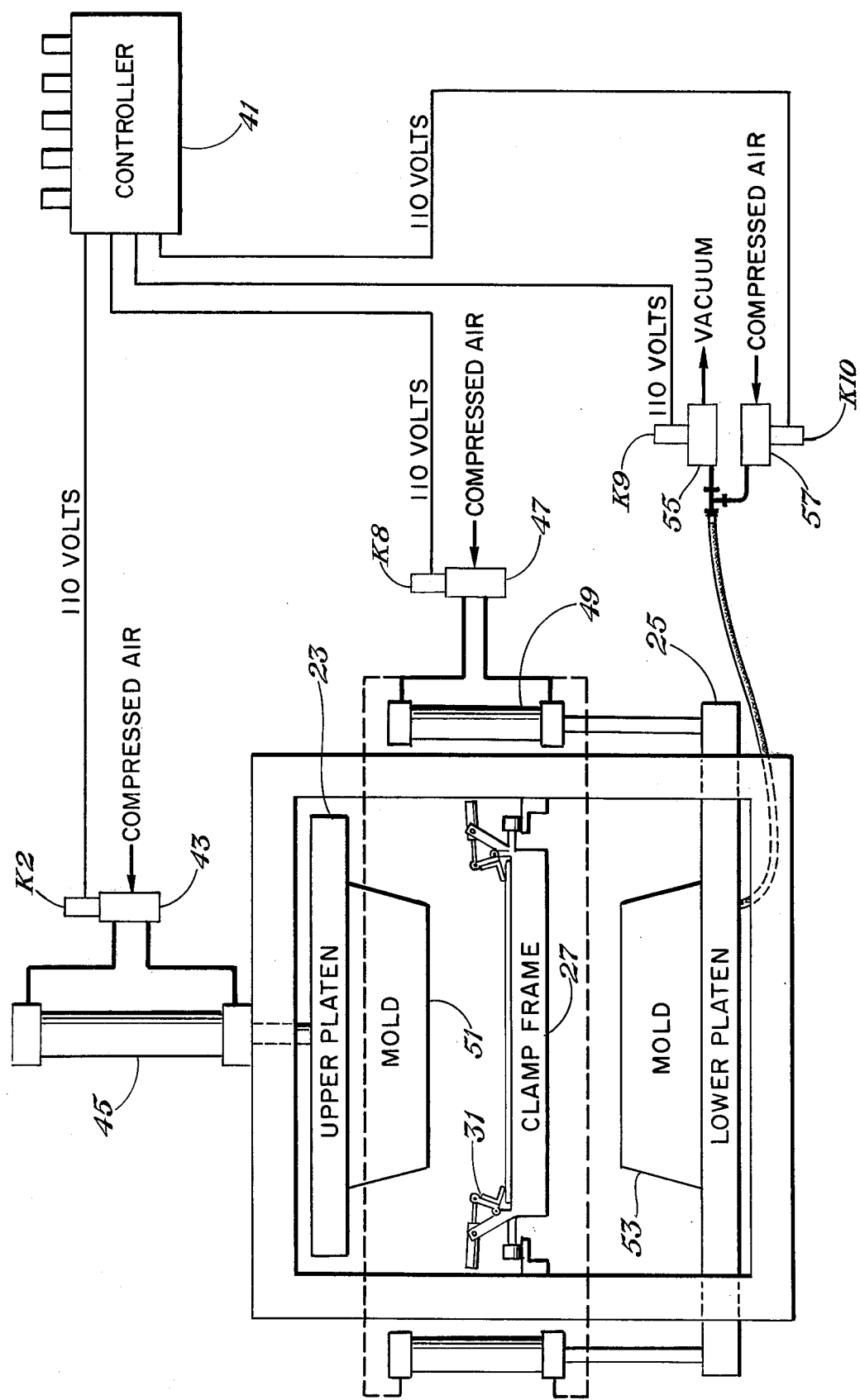
FIG. 2 is a schematic drawing of the machine of FIG. 1 with the controller of the present invention coupled thereto.

Referring now to FIG. 2, the controller of the present invention is identified at 41. It is employed for controlling 12 relays K1-K12 employed at 12 stations. Two of the stations are not used and are employed as spares. The 10 stations employed and their functions are set forth in Table 1 below.

TABLE 1

| Station | Switch | Relay | Relay State | Function |
|---|---|---|---|---|
| 1 | 1 | 1 | Energized | Inserts plastic holding frame into furnace. |
| 1 | 1 | 1 | De-energized | Returns plastic holding frame from furnace. |
| 2 | 2 | 2 | Energized | Lowers (upper platen) top mold onto plastic. |
| 2 | 2 | 2 | De-energized | Raises (upper platen) top mold from plastic. |
| 3 | 3 | 3 | Energized | Applies vacuum to form plastic against top mold. |
| 3 | 3 | 3 | De-energized | Removes vacuum from top mold. |
| 4 | 4 | 4 | Energized | Applies compressed air to release plastic from top mold or to form plastic with top mold. |
| 4 | 4 | 4 | De-energized | Stops flow of compressed air to top mold. |
| 5 | 5 | 5 | Energized | Provides air to cool formed plastic. |
| 5 | 5 | 5 | De-energized | Stops flow of cooling air. |
| 6 | 6 | 6 | | Spare station. |
| 7 | 7 | 7 | Energized | Releases clamps holding plastic to frame. |
| 7 | 7 | 7 | De-energized | Clamps plastic in frame. |

TABLE 1-continued

| Station | Switch | Relay | Relay State | Function |
|---|---|---|---|---|
| 8 | 8 | 8 | Energized | Raises (lower platen) bottom mold into plastic. |
| 8 | 8 | 8 | De-energized | Lowers (lower platen) bottom mold from plastic. |
| 9 | 9 | 9 | Energized | Applies vacuum to form plastic against bottom mold. |
| 9 | 9 | 9 | De-energized | Removes vacuum from bottom mold. |
| 10 | 10 | 10 | Energized | Applies compressed air to release plastic from from bottom mold or to form plastic with bottom mold. |
| 10 | 10 | 10 | De-energized | Stops flow of compressed air to bottom mold. |
| 11 | 11 | 11 | Energized | Sprays water mist onto formed plastic for cooling. |
| 11 | 11 | 11 | De-energized | Stops flow of water mist. |
| 12 | 12 | 12 | | Spare station. |

In FIG. 2 only relays K2, K8, K9, and K10 are shown. These relays as well as the other relays control valves for controlling the various components of the machine. For example, relay K2 controls 4-way valve 43 for appropriately applying compressed air to cylinder 45 for lowering and raising the platen 23. Relay K8 controls a 4-way valve 47 for appropriately applying compressed air to cylinder 49 for raising and lowering platen 25. Molds 51 and 53 are shown to illustrate the manner in which molds may be attached to or supported by the platens 23 and 25. Relay K9 controls a 2-way valve 55 for drawing a vacuum in mold 53 while relay K10 controls a 2-way valve 57 for applying compressed air to the mold 53. The functions of the other relays are set forth in Table 1. All of the relays are energized and de-energized by the controller 41 to perform the functions as set forth in Table 1.

Referring now to FIGS. 3A-3D, there will be described the controller 41 and its manner of operation. Basically, the controller includes 12 stations which comprise 12 toggle switches S1-S12, 12 WRITE GATES G1-G12, 12 MEMORIES M1-M12, 12 INVERTER BUFFERS B1-B12, 12 RELAY DRIVERS D1-D12, and 12 relays K1-K12. As shown, in each station, each switch has associated therewith a WRITE GATE, a MEMORY, an INVERTER BUFFER, a RELAY DRIVER, and a relay. As indicated above, station 6 and 12 are used only as spare stations. Each memory contains 1,024 addresses with a 1 bit capacity at each address for storing either a logic "0" or a logic "1". An address counter AC1 is coupled to memory M1 and an address counter AC2 is coupled to each of memories M2-M12. The address counters are STEPPED by a clocking system to sequentially address the station memories. Each of the switches S1-S12 may be moved to an ON (control) position or to a CLEAR position to effect a program mode and to an AUTOMATIC position for the automatic mode. During the program mode, the memories are each sequentially addressed by the address counters. If the switches are moved to the ON position, a logic "0" level is stored in the addresses of their memories as selected by the address counters. Conversely, when the switches are moved to the CLEAR position, a logic "1" level is stored in the addresses of the memories as selected by the address counters. The logic "0" or "1" level stored in the addresses in each memory during the program mode is employed to energize or de-energize its associated relay. A logic "0" level stored in the address of a memory will energize its relay and a logic "1" level stored in the addresses of the memory will de-energize its relay. Station 7 is unique since it is controlled by a SET-RESET LATCH 91. When the SET-RESET LATCH 91 is set, the relay K7 is energized and when the SET-RESET LATCH 91 is reset the relay K7 is de-energized. Pressing the START SWITCH 95 performs the reset function. Encountering a logic "0" at the output of memory M7 performs the set function. Once the SET-RESET LATCH 91 is set by a logic "0" from memory M7, it may only be reset by the START SWITCH 95 and any subsequent logic "0"s or logic "1"s from memory M7, prior to pressing the START SWITCH 95, have no effect. Table 1 indicates the function of the relays when they are energized and de-energized.

The operator operates the switches to move them to the ON and CLEAR positions to obtain the desired sequence of steps in an optimum time relationship. This information is stored in the appropriate memories for use in the automatic mode. The switches are then moved to the AUTOMATIC Mode positions whereby the memories do not accept any other data information and the memory content is not altered. During the automatic mode, the memories are again sequentially addressed by the address counters. When a logic "0" is encountered in a particular memory address, the relay for that function is energized and when a logic "1" is encountered, the relay is de-energized. The uniqueness of Station 7 is described above. During the automatic mode, the functions listed in Table 1 thus are generated in the same time relationship as determined by the operator in the program mode.

As mentioned above, the controller 41 may be operated in a program mode and in an automatic mode. When power is first applied, the controller is placed in an initialization mode. These three modes will now be described in detail beginning with the initialization mode. Reference will be made to FIGS. 3A-3D. The letters and symbols S1-S12, K1-K12, C, R, S, DI, DO, A, CE and R/W shown in these figures are defined in Table 2 below. In these Figures, stations 5, 6 and 8-10 are not shown. If they were illustrated, they would be shown located between stations 4 and 11 at the position of the dotted lines between these two stations.

TABLE 2

| | |
|---|---|
| S1-S12 | Front panel switches 1 through 12 |
| K1-K12 | Relays 1 through 12 |
| C | Clock Input |
| R | Reset Input |
| S | Set Input |
| DI | Data Input to memory |
| DO | Data Output from memory |
| A | Ten Address lines to memory (only one shown) |
| CE | Chip Enable (logic "0" level enables memory) |
| R/W | Read/Write control of memory |

INITIALIZATION MODE

When power is first applied, the controller 31 is placed in the INITIALIZATION MODE. The POWER ON LATCH 61 is set enabling the 3Khz oscillator 63 whose output is gated through the MULTIPLEXER 65 and on to the CLOCK line 67 where it serves three functions. The output of the oscillator 63 clocks the DISPLAY COUNTER 69 causing it to count through its range of 000 to 999 about three times per second (whenever the COUNTER passes 999 it overflows and starts at 000 again). Each time the DISPLAY COUNTER overflows, it sends a "carry" pulse to the OVERFLOW LATCH 71. This would ordinarily set the LATCH 71, which would then hold the CLOCK GENERATOR 73 and the DISPLAY COUNTER 69 locked in the reset mode and terminate operations. However, the OVERFLOW LATCH 71 is being held in the reset mode by the POWER ON LATCH 61 and does not set when the DISPLAY COUNTER 69 overflows. At this time the DISPLAY COUNTER 69, and DISPLAY 75 serve only as an indication that the system has had power applied and is in the initialization mode.

The output of the 3Khz oscillator 63 also steps the ADDRESS COUNTERS AC1 and AC2 which sequentially address the station memories M1 and M2-M12. Each memory contains 1,024 addresses with 1 bit capacity at each address. The ten-bit counters cycle from 0 to 1,023 approximately three times per second, repetitively scanning all 1,024 addresses of each MEMORY.

As a third function, the output of the 3Khz oscillator 63 enters the WRITE GENERATOR 77 which generates a pulse of approximately 10 microseconds duration, starting about 10 microseconds after the end of each clock cycle. The output of the WRITE GENERATOR, which is WRITE PULSE is then buffered by the INVERTING BUFFERS 79 and 81 which drive the WRITE GATES G1 and G2-G12. Each WRITE GATE prevents the WRITE PULSE from reaching the GATE's respective memory except when one of the three inputs, shown at the left side of the GATE is at logic "0".

The POWER ON LATCH 61 also drives the SWITCH DISABLE line 83 to a logic "1" level through the SWTICH DISABLE MULTIPLEXER 85. The INVERTERS 87 and 89 invert the logic "1" input and apply a logic "0" level to each of the WRITE GATES which then pass WRITE PULSES to their respective memories. Since the WRITE GENERATOR generates a WRITE PULSE for each clock cycle, a WRITE PULSE is applied to each of the 1,024 addresses of each memory as selected by the ADDRESS COUNTERS. All memories are enabled by the POWER ON LATCH at this time, so the WRITE PULSES allow the status of the DATA IN lines DI to be recorded in each memory address.

The DATA IN lines are at the logic "1" level at this time regardless of the position of the function switches S1-S12 because the SWITCH DISABLE line is high and both stator contacts of each switch are driven to the logic "1" level by pull-up resistors to the logic supply voltage. (The pull-up resistors are not shown in FIGS. 3A-3D). The logic "1" level of the DATA IN lines is therefore recorded in each of the memory addresses for all stations. The logic "1" level in each address produces a logic "1" level on the DATA OUT line DO of each memory which after inversion by the INVERTING BUFFER provides a logic "0" to the RELAY DRIVER inputs of all stations except station 7. The RELAY DRIVERS, therefore provide a de-energized relay state for all stations except station 7.

The station 7 INVERTING BUFFER drives a SET-RESET LATCH 91 which was set upon application of system power by the POWER ON SET block 93. While the SET-RESET LATCH is set, its buffered output turns the RELAY DRIVER D7 on, energizing K7. All relays are now in the correct INITIALIZATION MODE configuration and the controller is ready to be programmed.

PROGRAM MODE

The operator normally begins the PROGRAM MODE by placing S1 and one of the MOLD switches (S2 or S8) in the ON position and the other function switches in the AUTO position either during the INITIALIZATION MODE or while the START button (START SWITCH 95) is pressed. The switches are disabled in both cases and have no effect at this time.

The operator next presses a START button and hence START switch 95 which is followed by a DEBOUNCE CIRCUIT 97 to eliminate switch contact bounce and provide a clean step function to drive the logic circuits. Activation of the START switch performs the following functions:

1. Reset the SET-RESET LATCH 91 de-energizing K7 which causes the frame clamps 31 to clamp the plastic in the frame.

2. Resets the POWER ON LATCH 61 which disables the 3Khz OSCILLATOR 63 and allows the second "D" FLIP-FLOP 99 to enable either station 1 memory or the stations 2-12 memories M2-M12.

3. Resets both "D" FLIP-FLOP 101 and 99 forcing the second "D" FLIP-FLOP 99 to enable station 1 MEMORY M1, disable stations 2-12 memories M2-M12, and reset the stations 2-12 ADDRESS COUNTER AC2.

4. Resets and holds the CLOCK GENERATOR 73 so that a clock pulse will not be generated.

5. Resets the DISPLAY COUNTER 69 to 000 seconds.

6. Resets the station 1 ADDRESS COUNTER AC1 to address 0.

7. Maintains the SWITCH DISABLE and OVERFLOW LATCH reset conditions as established in the INITIALIZATION MODE.

The operator next releases the START button deactivating the START switch 95. De-activating the START switch removes the reset condition from the CLOCK GENERATOR, LATCHES, FLIP-FLOPS, and COUNTERS and drops the SWITCH DISABLE line 83 to a logic "0" state. This presents a logic "0" to the inputs of the INVERTERS 87 and 89 disabling the WRITE GATES which prevents each MEMORY from receiving a WRITE PULSE unless its associated function switch is in the ON or CLEAR position. Only the station 1 memory M1 is enabled at this time so it is the only memory capable of responding to the WRITE command.

Removing the reset condition from the CLOCK GENERATOR 73 allows it to start dividing the AC line frequency and produce 1 second clock pulses. The first 1 second clock pulse steps the DISPLAY COUNTER 69 from 000 to 001 indicating that 1 second has elapsed and advances the station 1 ADDRESS COUNTER AC1 from address 0 to address 1. There is always a ten microsecond delay from each clock pulse to the WRITE PULSE to allow the COUNTER and MEMORY adequate time to settle at the new address before writing into it. After this delay, a WRITE PULSE is generated writing a logic "0" into the station 1 MEMORY M1. This appears at the output of the station 1 MEMORY and after inverting and buffering energizes relay K1 which inserts the plastic and frame 27 into the furnace.

Each successive 1 second clock pulse advances the DISPLAY COUNTER 69 to indicate another second has elapsed and advances the ADDRESS COUNTER AC1 to the next address. During the the microsecond delay after each clock pulse, the station 1 memory M1 is storing a logic "1" state (from INITIALIZATION). At the conclusion of the delay period the WTITE PULSE writes a logic "0" state into the address; long before the relay has had time to de-energize. Consequently, the relay K1 is maintained energized as long as S1 is in the ON position.

When the operator determines that sufficient heat has been applied to the plastic, he places S1 in either the AUTO or CLEAR positions. In the AUTO position, the memory M1 puts out the stored state of each subsequent address. These subsequent addresses will contain logic "1" states due to the previous INITIALIZATION MODE. The logic "1" from memory de-energizes K1. If the operator switches S1 to the CLEAR position, the memory will still be receiving the WRITE PULSE command, but will now be storing a logic "1" in the subsequent addresses. This will also de-energize K1. De-energizing K1 causes the plastic holding frame 27 to leave the furnace 29 and return to the rest position activating the LIMIT switch 103. The LIMIT switch immediately clocks the 1st D FLIP-FLOP 101 into the "1" state setting the "D" input of the 2nd "D" FLIP-FLOP 99 to a logic "1" state. The first CLOCK PULSE that occurs after this advances the DISPLAY COUNTER 69 and sets the second D FLIP-FLOP 99 which disables the station 1 memory M1 and enables the station S1-S12 memories M2-M12. A diode 105 and resistor 107 from the output of the ENABLE MULTIPLEXER 109 to the station 1 memory M1 enable CE allows logic "1" states to be written into station 1 memory for the remainder of the machine cycle. This feature assures that K1 cannot be inadvertently re-energized by logic "0" states that may have been stored in station 1 memory during a previous programming operation. This will be described in detail below.

The first clock pulse occurring after LIMIT switch actuation also applies a WRITE PULSE (after the 10 microsecond delay) to each of the stations 2-12 WRITE GATES. If S2 (or S8) is in the control position, its WRITE GATE passes the WRITE PULSE causing an ON state to be stored into address 0 of its memory. The next clock pulse, and all subsequent ones, advance the stations 2-12 ADDRESS COUNTER AC2, the DISPLAY COUNTER 69, and after the 10 microsecond delay generate WRITE PULSES which cause the memories to record the positions of function switches S2-S12 when they are in the control or clear positions. Programming the positions of these switches into memory is identical to the programming previously described for station 1 except that the timing is referenced to the first clock pulse occurring after LIMIT switch 103 initiation.

Since one or both of the MOLD switches S2 and S8 (depending on the article being formed) are in the ON position, either K2 or K8 (or both) is energized 10 microseconds after the first clock pulse that occurs after the LIMIT switch 103 is activated applying the selected mold to the hot plastic. When the operator sees that the mold base has engaged the frame 27, he places the VACUUM switch (S3 or S9) in the ON position. Within 1 second (after 1 CLOCK PULSE), logic "0" states are being written into station memory turning the VACUUM on. After allowing adequate time for the plastic to completely form against the mold, the operator places the COOLING switch (S5) in the ON position. After adequate cooling time the operator terminates the VACUUM period by placing the VACUUM switch (S3 or S9) in the CLEAR position. The AIR switch (S4 or S10) may be placed in the ON position at the same time so that there will be no delay from the termination of vacuum to the application of air to release the plastic from the mold. The mold is now removed from the formed piece by placing the MOLD switch (S2 or S8) in the CLEAR position. After one or two seconds the operator places the AIR switch (S4 or S10) in the CLEAR position to turn off the air and places the CLAMP RELEASE switch S7 in the ON position. This sets the SET-RESET LATCH 91 (through the STATION 7 MEMORY M7) releasing the frame clamps 31. Only ONE on state in the station 7 MEMORY is required to set the SET-RESET LATCH. The LATCH will remain set, and the clamps released, until the START button is pressed again.

After frame clamp release, the operator normally allows the controller to continue programming the COOLING cycle which he is removing the formed piece and replacing it with a new sheet of plastic. If the maximum display time of 1000 seconds is exceeded, the DISPLAY COUNTER 69 will overflow (exceed a count of 999 and return to a count of 000) and set the OVERFLOW LATCH 71. The OVERFLOW LATCH, while set, accompanies the same functions as activation of the start switch except that the SET-RESET LATCH is not reset. This results in termination of all functions not yet terminated by the operator. The operator then places all function switches in the AUTO position (terminating all functions if DISPLAY COUNTER overflow has not occurred). The controller is now programmed to reproduce the production cycle exactly as performed manually by the operator.

AUTOMATIC MODE

In the AUTOMATIC MODE, the operator presses and releases the START button to begin the production cycle. The controller responds exactly as described for the PROGRAM MODE, but since all function switches are now in the AUTO position, memory content is not altered. Station 1 memory addresses are scanned at the 1 second per address rate until the end of the programmed heat cycle is reached the LIMIT switch 103 is actuated. Then the station 2-12 memories M1-M12 are scanned at the same rate. When a logic "0" is encountered in a particular memory address, the relay for that function is energized, and when a logic "1" is encountered, the relay is de-energized. The uniqueness of Station 7 has been described previously. The functions listed in Table 1 are therefore generated with the same time relationships as determined by the operator in the PROGRAM MODE.

The operator can alter the program for any function by assuming manual control of that particular station during any subsequent production cycle during the AUTOMATIC MODE. Manual control is assumed to place a given station in the program mode by moving the toggle switch of that station to the ON or CLEAR position. Station 1 can only be altered prior to LIMIT SWITCH 103 actuation, (with the exception described below) however, and stations 2-12 can only be altered after LIMIT SWITCH actuation.

Figure 3A:
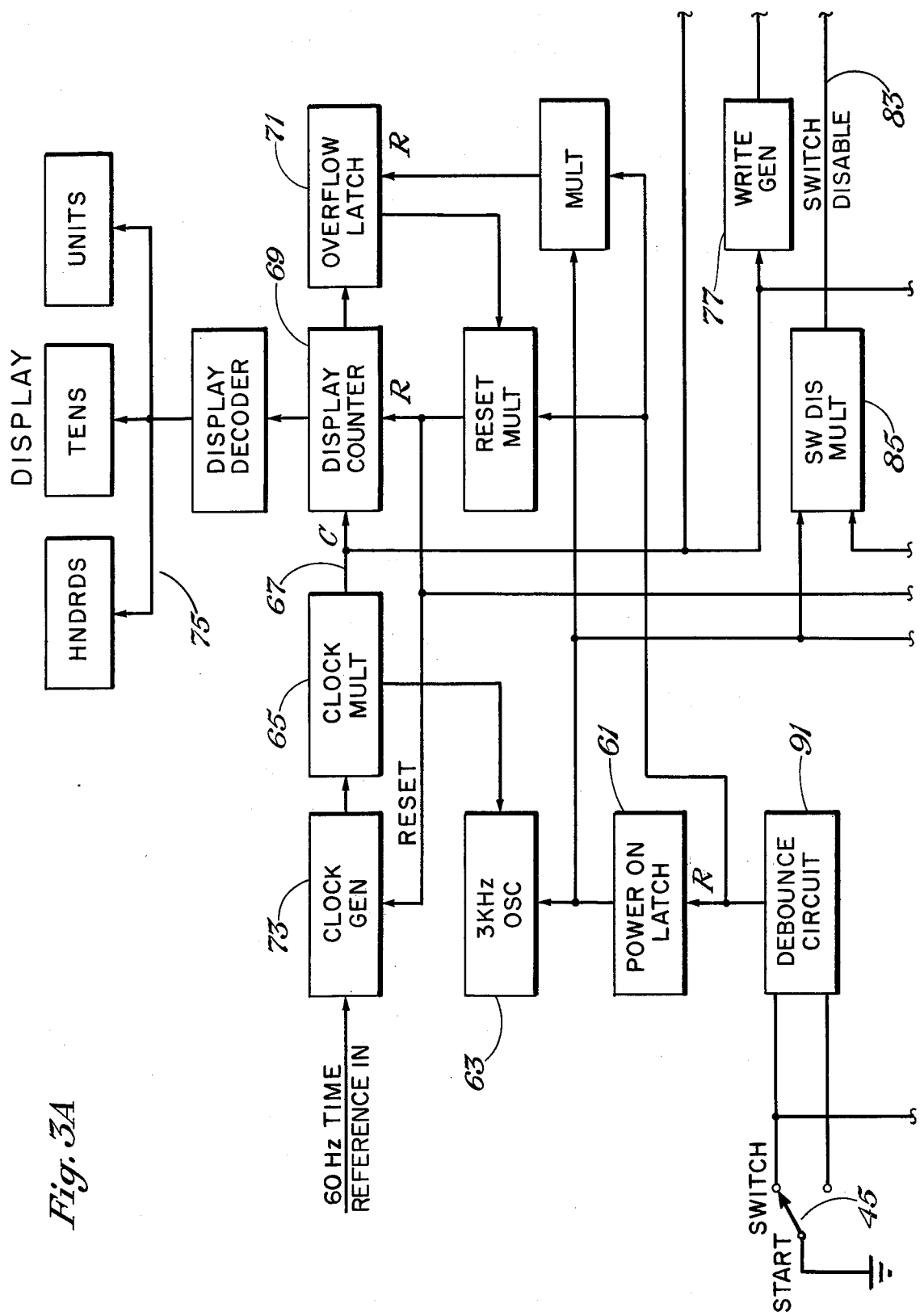
FIGS. 3A-3D illustrate a schematic diagram of the controller of the present invention.
Figure 3B:
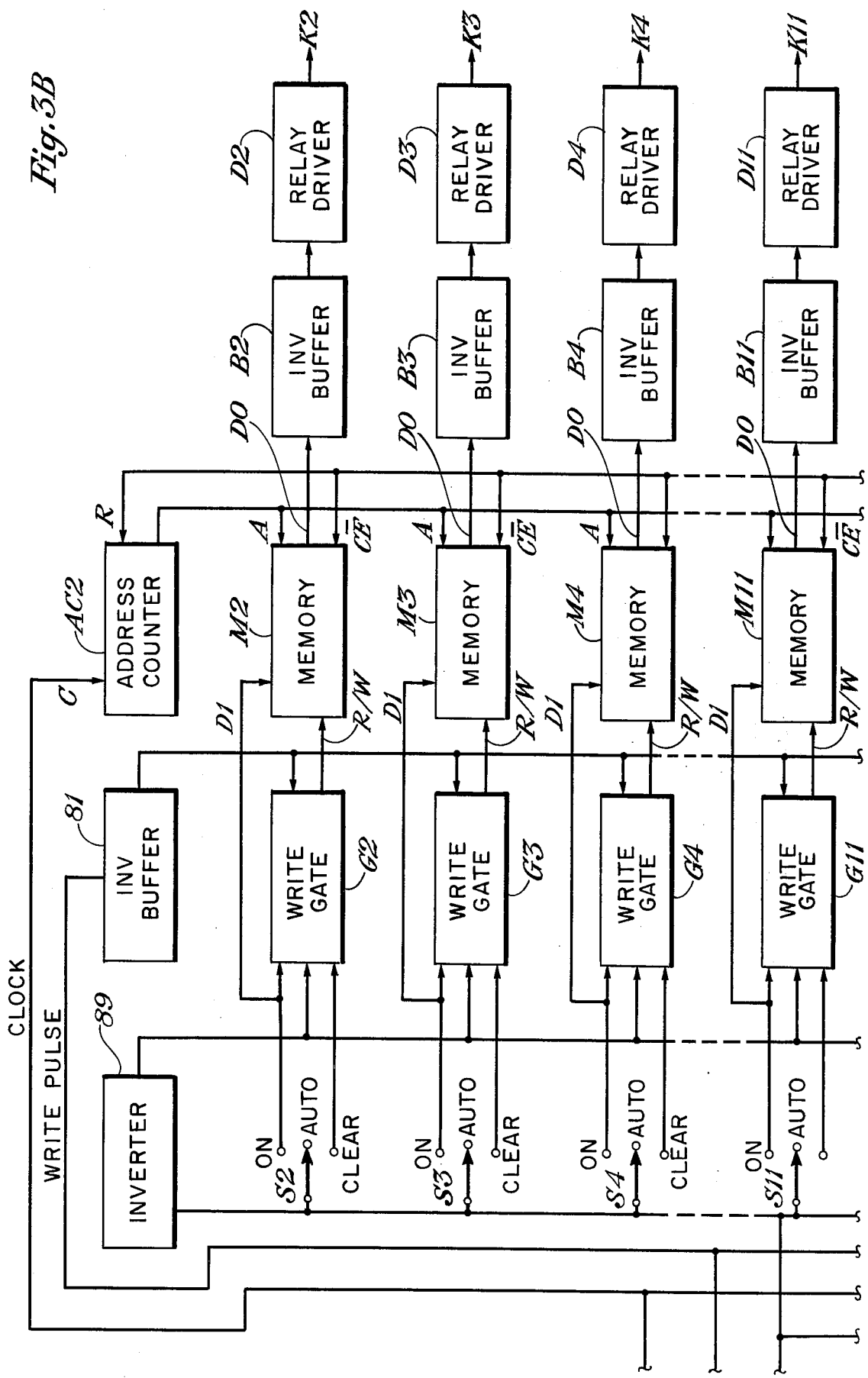
Figure 3C:
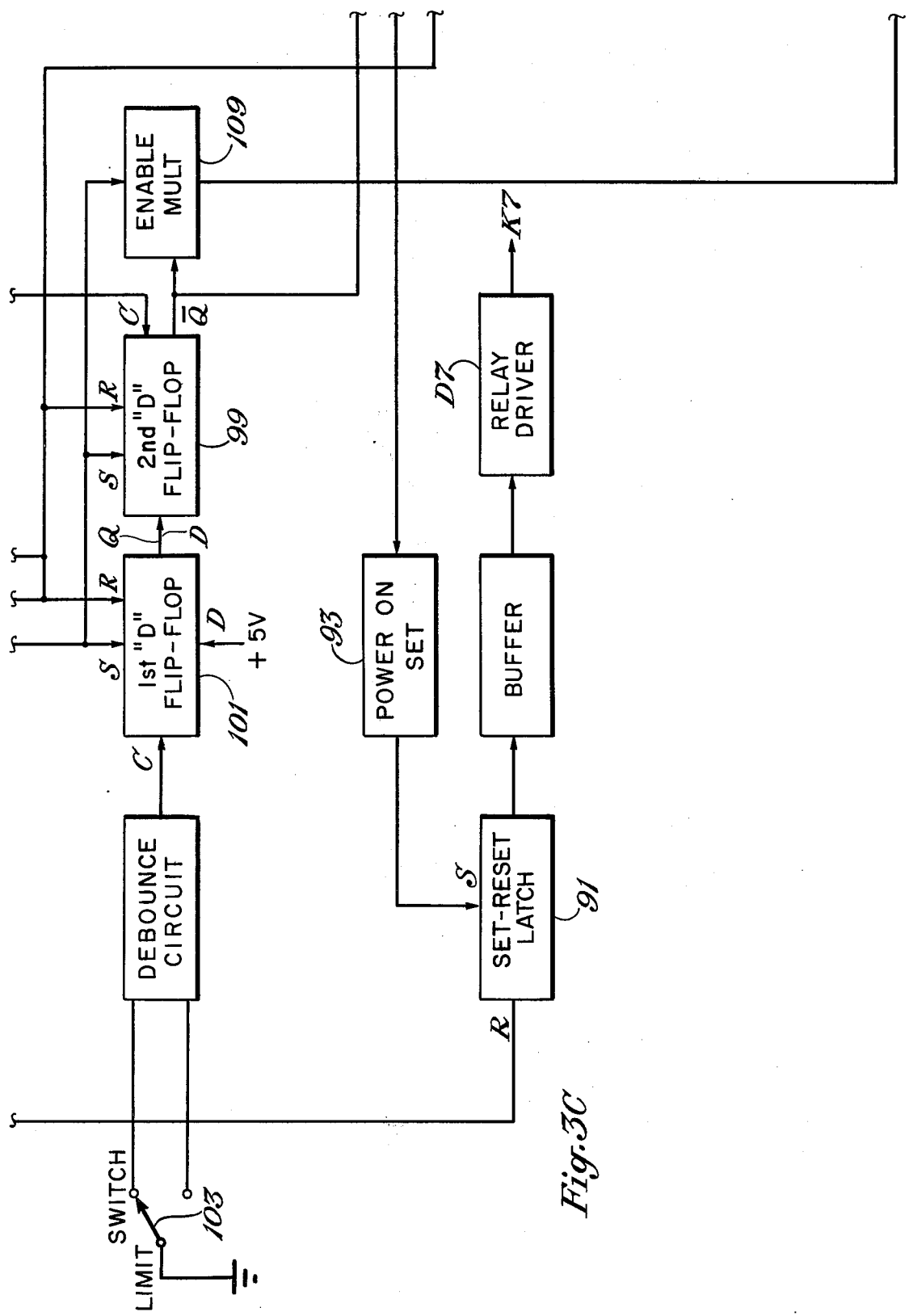
Figure 3D:
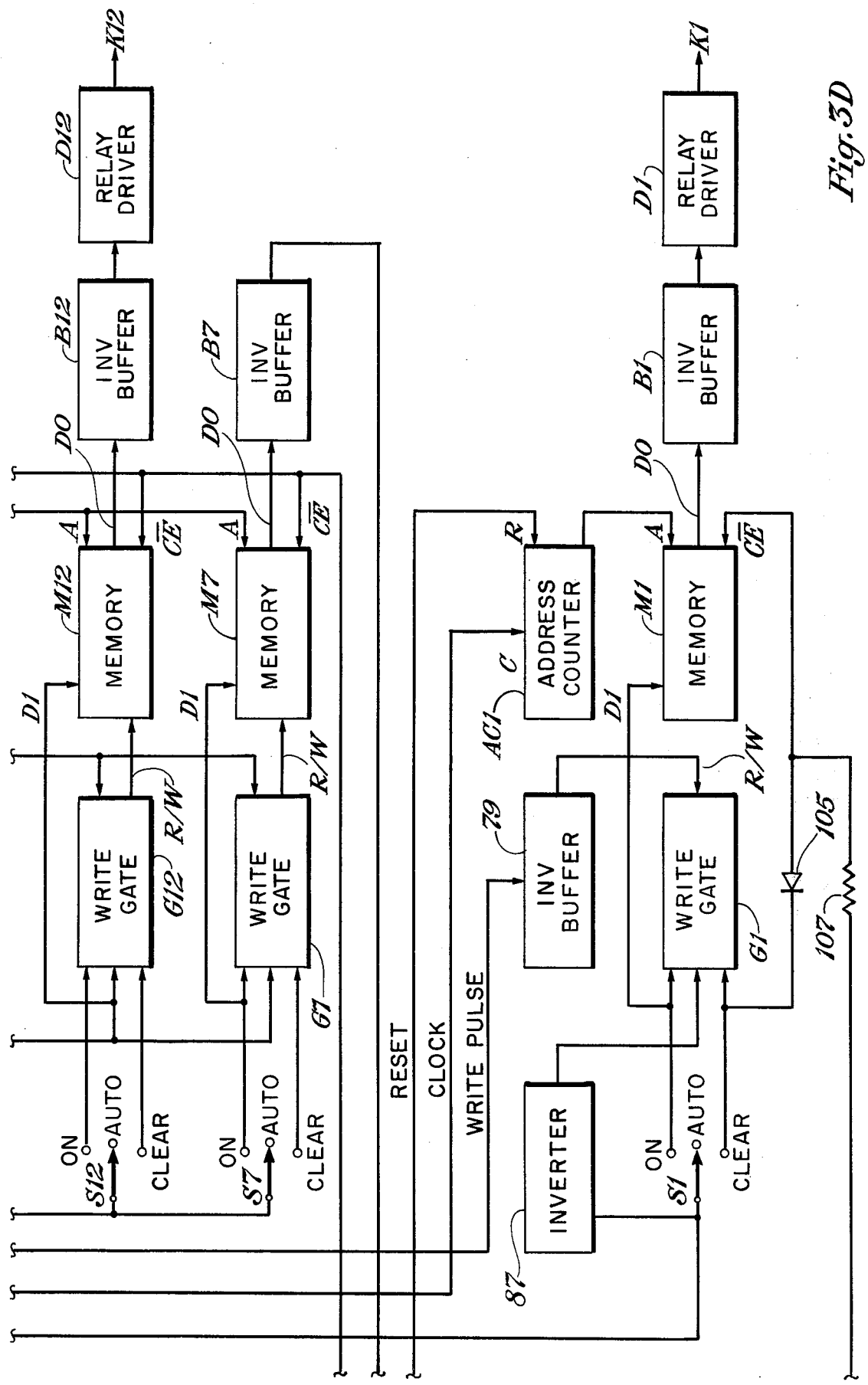

The diode 105 and resistor 107 on the CE input of station 1 memory M1 shown in FIG. 3D provides the ability to write OFF states into it after the second D FLIP-FLOP 99 has disabled that memory and enabled the others.

The purpose for this feature may be made clear by the following example and assuming that the diode 105 and resistor 107 are not used.

If the operator had previously programmed in a station 1 ON time of, e.g., 150 seconds and he wanted to shorten this to 120 second, he would place S1 in the CLEAR position at 119 seconds. OFF states would then be written into the memory (starting at address 120) clearing out the previously stored ON states until the limit switch operation disabled the memory. In the present application this would occur about 4 seconds after station 1 was de-energized and would leave unwanted ON states stored from about 124 seconds to the original 150 seconds point.

The 124 second to 150 second ON state would not create a problem if the limit switch, during the subsequent controller cycles, always disabled the memory before the 124 second point was reached. However, if there was an extra 1 or more seconds delay in the operation of the limit switch by the machine, the 124 second position would be reached causing station 1 to re-energize. This would then prevent the operation of the limit switch and leave station 1 ON until after 150 seconds.

The addition of the diode 105 and resistor 107, allows the operator to clear ON states from the memory beyond the limit switch actuation. ON states cannot be written into station 1 after the limit switch transfers control to the other stations.

In one embodiment, the WRITE GATES are identified as type 7410 manufactured by Texas Instruments; the MEMORIES are identified as type 2102 manufactured by Intel of California; the ADDRESS COUNTERS are identified as type CD4040A manufactured by R.C.A.; and the RELAY DRIVES are NPN type transistors. The 7410 is a triple input NAND gate. Two of the NAND gates are used for a WRITE GATE function and the third NAND gate is used as the WRITE GATE's associated INVERTER BUFFER.

We claim:

1. A control system for controlling on operating system for performing a sequence of operating steps, said operating system having a plurality of power means each being adapted to be actuated or de-actuated for controlling said operating steps, said control system comprising:
 a plurality of manually controllable switch means,
 each switch means being associated with one of said power means,
 each switch means being adapted to be moved to a control position and to a clear position creating a program mode and to an automatic position creating an automatic mode,
 storage means coupled to each switch means and adapted to be coupled to the power means associated with each switch means for sequentially recording data representative of the positions of each switch means as it is moved to its control and clear positions,
 each power means being adapted to be actuated or de-actuated in accordance with the data stored in its associated storage means,
 each storage means when its associated switch means is in its automatic mode position being adapted to have the switch position data previously recorded therein during the program mode, sequentially read out whereby each storage means will automatically cause its associated power means to be actuated or de-actuated in the same time relationship as occured when its associated switch means was moved to its control and clear positions during the program mode.

2. A control system for controlling an operating system for performing a sequence of operating steps, said operating system having a plurality of power means each being adapted to be actuated and de-actuated for controlling said operating steps, said control system comprising:
 a plurality of manually controllable switch means,
 each switch means being associated with one of said power means,
 each switch means being adapted to be moved to a control position and to a clear position creating a program mode and to an automatic position creating an automatic mode,
 memory means coupled to each switch means and adapted to be coupled to the power means associated with each of said switch means,
 each memory means comprising a plurality of addresses each of which is capable of storing a binary bit of a "0" or "1" state,
 address means for sequentially addressing the addresses of each memory means,
 each switch means when in its control position causing a binary bit of one of said states to be applied to and stored in the addresses of its associated memory as sequentially selected by said address means,
 each switch means when in its clear position causing a binary bit of the other of said states to be applied to and stored in the addresses of its associated memory as sequentially selected by said address means,
 each power means being adapted to be actuated or de-actuated in accordance with the states of the binary bits stored in the address of its associated memory as sequentially selected by said address means,
 each memory means when its associated switch means is in its automatic mode position being incapable of having its memory content altered whereby said memory means when sequentially addressed by said address means will automatically cause its associated power means to be actuated or de-actuated in accordance with the states of the binary bits previously stored therein and in the same time relationship as occured when its associated switch means was moved to its control and clear positions during the program mode.

3. A method of operating a control system for controlling an operating system for performing a sequence of operating steps, said operating system having a plurality of power means each being adapted to be actuated and de-actuated for controlling said operating steps, said control system comprising a plurality of manually controllable switch means; each switch means being associated with one of said power means; each switch means being adapted to be moved to a control position and to a clear position creating a program mode and to an automatic position creating an automatic mode, memory means coupled to each switch means and to the power means associated with each switch means; each memory means comprising a plurality of addresses each of which is capable of storing a binary bit of a "0" or "1" state; and address means for sequentially addressing the addresses of each memory means, said method comprising the steps of:

sequentially addressing the addresses of each memory means, moving each switch means to its control position in a desired sequence to cause a binary bit of one of said states to be applied to and stored in the addreses of its associated memory as sequentially selected by said address means, moving each switch means to its clear position in a desired sequence to cause a binary bit of the other of said state to be applied to and stored in the addresses of its associated memory as sequentially selected by said address means, as said binary bits are sequentially stored in the addresses of each of said memories applying data representative of said binary bits to each of said power means associated with each of said memories to actuate or de-actuate said power means in accordance with the states of the binary bits sequentially stored in the addresses of the memories.

moving each of said switch means to its automatic mode, sequentially addressing the addresses of each of said memory means to sequentially read out the data stored therein, and applying data representative of the binary bits stored in each of said memory means to the associated power means to cause the associated power means to be actuated or de-actuated in accordance with the states of the binary bits previously stored in the associated memories whereby said associated power means will be actuated or de-actuated in the same time relationship as occured during the program mode.

* * * * *